US012197146B2

(12) United States Patent
His

(10) Patent No.: US 12,197,146 B2
(45) Date of Patent: Jan. 14, 2025

(54) POWDER CONTAINER COUPLING MECHANISM

(71) Applicant: General Plastics Industrial Co., Ltd., Taichung County (TW)

(72) Inventor: Chuang Chin His, Taichung (TW)

(73) Assignee: General Plastics Industrial Co., Ltd., Taichung (TW)

( * ) Notice: Subject to any disclaimer, the term of this patent is extended or adjusted under 35 U.S.C. 154(b) by 43 days.

(21) Appl. No.: 18/059,716

(22) Filed: Nov. 29, 2022

(65) Prior Publication Data

US 2023/0176502 A1 Jun. 8, 2023

Related U.S. Application Data

(60) Provisional application No. 63/265,067, filed on Dec. 7, 2021.

(51) Int. Cl.
*G03G 15/08* (2006.01)
*G03G 21/16* (2006.01)

(52) U.S. Cl.
CPC ..... *G03G 15/0877* (2013.01); *G03G 15/0822* (2013.01); *G03G 15/0865* (2013.01); *G03G 15/0867* (2013.01); *G03G 15/087* (2013.01); *G03G 15/0872* (2013.01); *G03G 15/0875* (2013.01); *G03G 15/0879* (2013.01); *G03G 15/0881* (2013.01); *G03G 15/0886* (2013.01); *G03G 15/0896* (2013.01); *G03G 21/1647* (2013.01); *G03G 21/1676* (2013.01)

(58) Field of Classification Search
CPC ........... G03G 15/0822; G03G 15/0865; G03G 15/0867; G03G 15/087; G03G 15/0872; G03G 15/0875; G03G 15/0877; G03G 15/0879; G03G 15/0881; G03G 15/0886; G03G 15/0896; G03G 21/1676; G03G 21/1647
See application file for complete search history.

(56) References Cited

U.S. PATENT DOCUMENTS 9,217,956 B1 * 12/2015 Wegman ............ G03G 15/0886
2010/0215395 A1 8/2010 Funada et al.
2010/0329699 A1 * 12/2010 Ohyama ............ G03G 15/0879 399/262
2019/0204778 A1 7/2019 Gamo et al.
2021/0103233 A1 * 4/2021 Erickson ............ G03G 15/0872
2021/0341854 A1 11/2021 Chuang

FOREIGN PATENT DOCUMENTS

CN 116243571 6/2023
EP 2720088 A1 4/2014
TW 202338527 A 10/2023

OTHER PUBLICATIONS

"European Application Serial No. 22210351.7, Extended European Search Report mailed Aug. 2, 2023", 12 pgs.

* cited by examiner

*Primary Examiner* — Joseph S Wong
(74) *Attorney, Agent, or Firm* — Schwegman Lundberg & Woessner, P.A.

(57) ABSTRACT

A powder cartridge with a cartridge interface at a proximal, open end of a cartridge body. The cartridge interface has a dispense mechanism opened to the cartridge body and a coupling mechanism coupled with the dispense mechanism. The coupling mechanism includes at least one coupling extension and at least one shuttle configured for movable coupling with the dispense mechanism.

20 Claims, 12 Drawing Sheets

POWDER CONTAINER COUPLING MECHANISM

CROSS-REFERENCE TO RELATED APPLICATION

This patent application claims the benefit of U.S. Provisional Patent Application No. 63/265,067, filed Dec. 7, 2021, which is incorporated by reference herein in its entirety.

TECHNICAL FIELD

This document pertains generally, but not by way of limitation, to coupling or engagement mechanism and components for powder, toner or developer containers.

BACKGROUND

Powder cartridges, containers or devices are known to hold or contain powder used for printing or copying. The powder, such as toner or developer, is dispensed from the powder cartridge and into an image forming apparatus. When dispensing powder from the cartridge, the cartridge first is brought into engagement with the image forming apparatus. The cartridge is then opened to allow powder to be dispensed, exhausted or exit the cartridge and into a corresponding receiving area of the image forming apparatus.

In the industry, there are many different coupling features known to bring corresponding portions of the image forming apparatus into engagement with the cartridge and to open dispense openings or receiving areas. For example, the image forming apparatus has engagement protrusions that meet or couple with corresponding portions of the cartridge body which cause a shutter or opening on the cartridge to slide or rotate open. In another example, the image forming apparatus can have features that apply pressure or force against areas of the cartridge and translate such movement to shutters or opening mechanisms. In an example, such pressure or force causes powder to dispense or exit from the cartridge and into the image forming apparatus.

SUMMARY

The present inventors have recognized, among other things, a problem exists related to systems for containing toner, developer or other marking powders ("powder") that are dispensed from the system and into corresponding receptacles in image forming apparatuses, such as printers, copiers or multi-function machines. The present inventors have also recognized mechanisms used to couple the powder containing systems, in an example, do not effectively bring corresponding components of the system and imaging forming apparatus together. In an example, a powder containing system has a component that couples with a corresponding component in the image forming apparatus to join the system with the image forming apparatus. Joining the system and image forming apparatus, in an example, holds the system in place during use. In another example, joining the system and image forming apparatus opens the system to dispense powder into the corresponding receptacle in the image forming apparatus.

The present inventors have recognized a way for solving the problem related to effectively engaging the system containing the powder with the receptacle in the image forming apparatus. An example coupling mechanism is on a cartridge, container or similar device containing the powder. The coupling mechanism is, for example, a cartridge interface that has a dispense mechanism. The dispense mechanism has, for example, a dispense opening configured for communication with the receptacle, or powder receiving component, of the image forming apparatus. In an example, the dispense mechanism also has a coupling mechanism that has coupling extensions that couple with components of the image forming apparatus. When the coupling extensions couple with the image forming apparatus, a shuttle, for example, on the coupling mechanism can limit and control movement of the coupling mechanism during the process of the cartridge interface engaging with the image forming apparatus.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
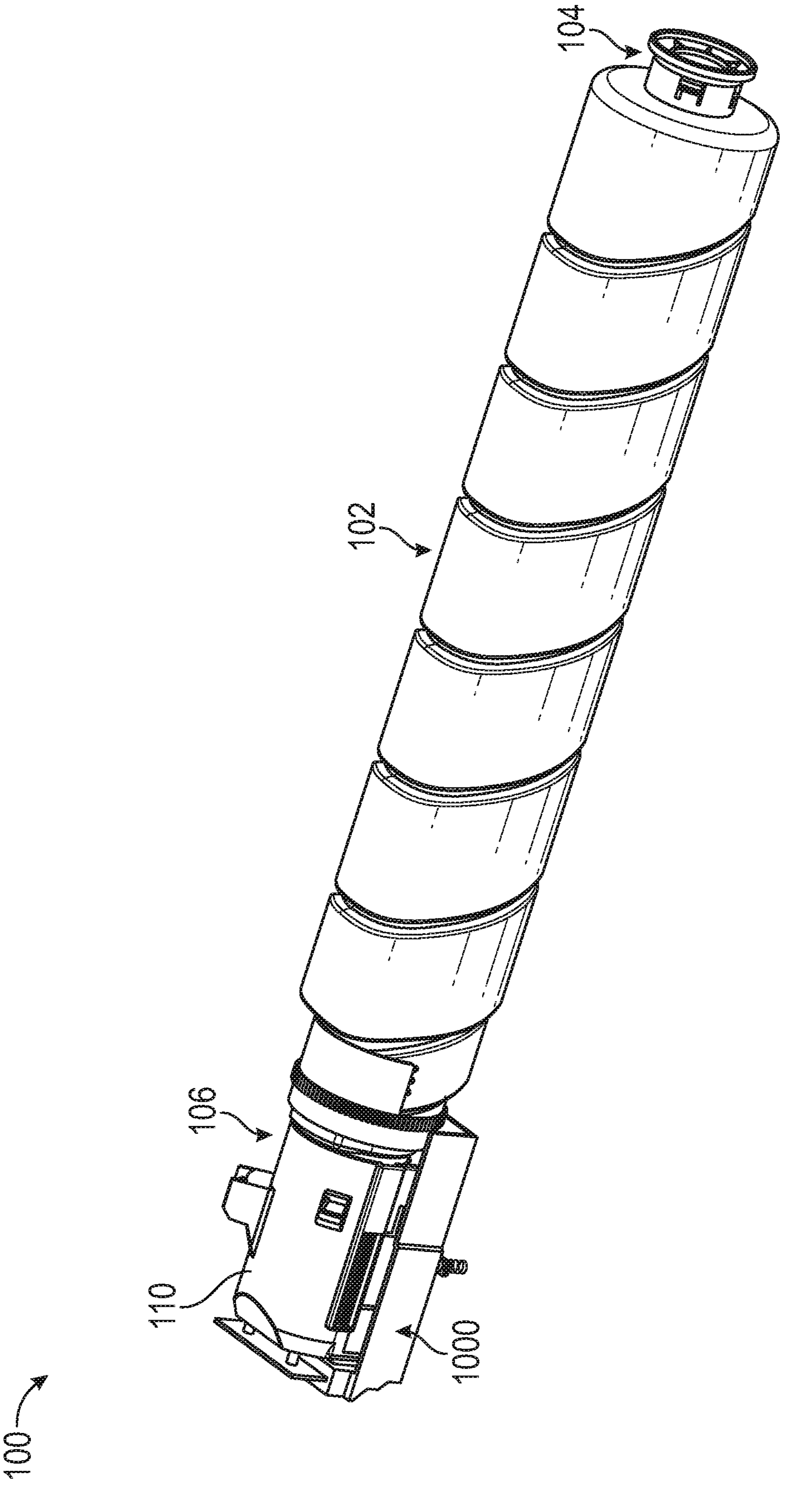
FIG. 1 illustrates an example of a powder container coupled with a hopper of the image forming apparatus.

Printers and copiers use containers, cartridges, bottles or similar devices (hereinafter "cartridge") to hold, contain or house toner, developer or other marking powder. These cartridges are known to be in a bottle or cylindrical configuration or a box or substantially rectangular cartridge. In one example, a bottle, or generally cylindrical, shaped cartridge is used to contain powdered substances, such as toner or developer or the like (hereinafter "powder"). Such bottle-like cartridges have, in some examples, a cartridge interface coupled with a proximal, open end of the cartridge body. In an example, the proximal end with the cartridge interface is the end of the cartridge that is first inserted into the image forming apparatus.

In an example, the cartridge is a vessel configured to hold powder. The powder is then used in an image forming apparatus to facilitate forming copies or prints on paper, fabric or other similar media. The cartridge has at least one feature configured to allow the cartridge to dispense the powder contained therein. The feature of a cartridge for dispensing powder, for example, is configured to interact with a corresponding element of the image forming apparatus that receives the powder.

Cartridge interfaces can include features that can assist with coupling the cartridge body to the interior or working parts of a copy machine or image forming apparatus (hereinafter "image forming apparatus"). Cartridge interfaces can connect or couple the cartridge body along or at any suitable portion of the cartridge to a corresponding portion of the image forming apparatus. In other examples, cartridge interfaces can connect or couple the proximal or distal end of the cartridge to a corresponding portion of the image forming apparatus.

In some examples, cartridge interfaces connect or couple the cartridge body with powder dispense areas of the cartridge. Dispense areas include openings in at least a portion of the cartridge to release or exhaust powder into powder receiving areas at corresponding areas of the image forming apparatus. In some examples, the cartridge is connected or coupled proximate to the dispense area at or near corresponding areas of powder receiving areas of the image forming apparatus.

In an example of a cartridge with a cartridge interface proximate to the dispense area, at least a portion of the cartridge interface couples the cartridge to the powder receiving area so the cartridge is held, locked, or engaged in place with the powder receiving area. The cartridge interface can be proximate to the insertion end of the cartridge or at any other location as determined by its use.

In some embodiments, the cartridge interface has multiple purposes beyond holding, locking or engaging the cartridge body and for dispensing powder from the cartridge. For example, the cartridge interface includes a mechanism to assist with opening the powder dispense port of the cartridge. The cartridge interface, for example, also engages with components of the image forming apparatus to activate or deactivate operation of the cartridge, such as electronic components, gears, lockouts or other features that are used in operation of the cartridge.

In an example cartridge 100, there is a cartridge body 102. The cartridge 100 has a distal end 104 and a proximal end 106. The proximal end 106, for example, is an insertion end, or the end a user inserts first into an image forming apparatus (hereinafter the proximal end 106 will be referred to as the insertion end 106). The hopper 1000 provides, for example, at least a portion of the support structure for the cartridge 100 when the cartridge 100 is inserted into the image forming apparatus. An example of a portion of a hopper 1000 of the image forming apparatus is illustrated in FIG. 1 as the portion that receives the insertion end 106. A user, for example, advances or progresses the cartridge 100 into the hopper 1000. The insertion end 106 couples with the hopper 1000, for example, when the cartridge 100 is inserted into the image forming apparatus. In one example, the insertion end 106 is the portion of the cartridge 100 that provides the features to transfer powder from within the cartridge 100 to the image forming apparatus.

Figure 2A:
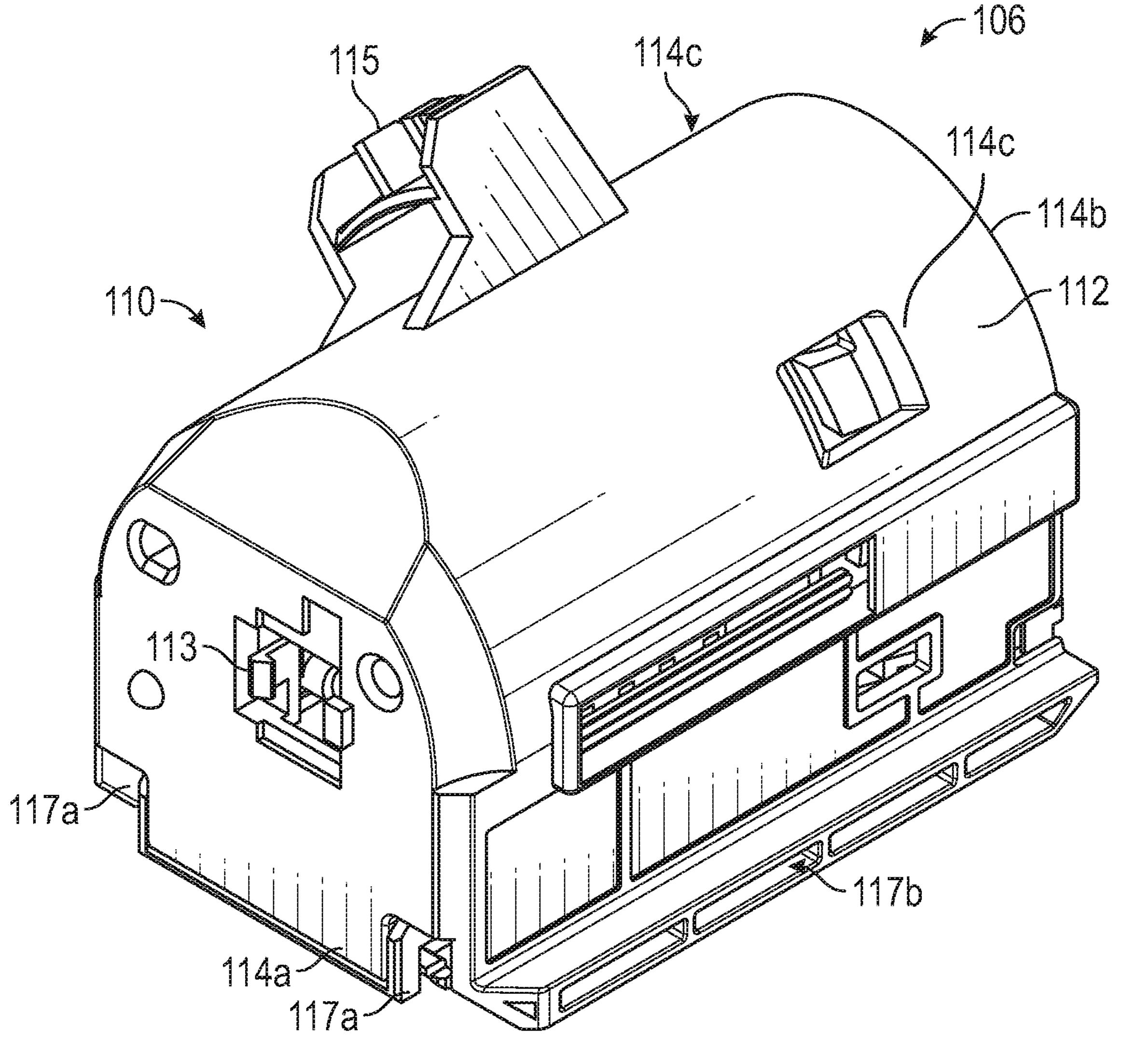
FIG. 2A illustrates a perspective front view of a cartridge interface.
Figure 2B:
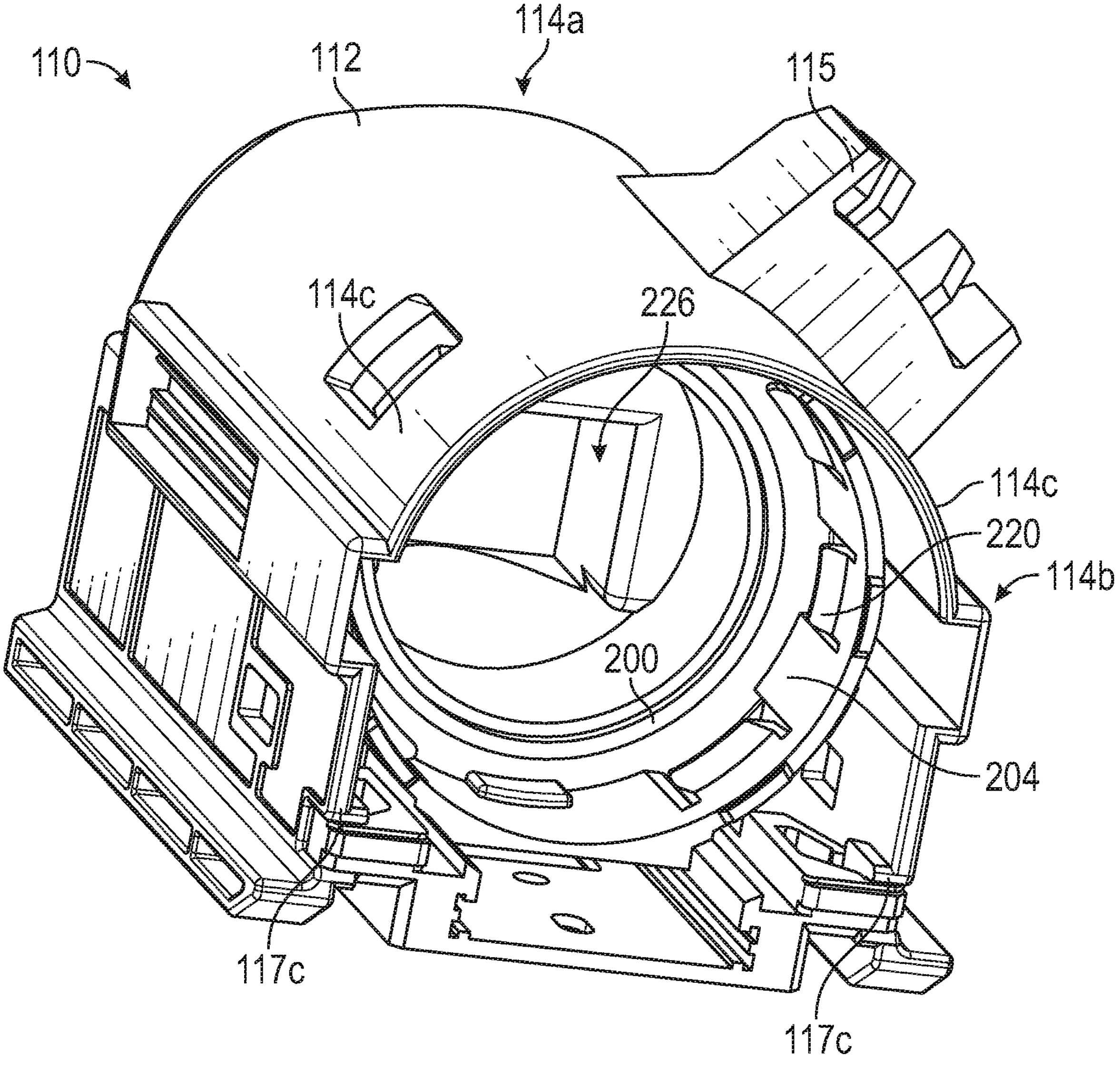
FIG. 2B illustrates a perspective rear view of a cartridge interface.

In an example of a cartridge interface 110, as illustrated in FIGS. 2A and 2B, there is at least a cover 112. The cover 112 is, for example, a cap or enclosure that protects mechanical features such as engagement features (as will be discussed further, below) of the insertion end 106 of the cartridge 100. The cover 112 protects engagement features such as a dispense mechanism, a coupling mechanism, or other mechanical or electrical components from environmental conditions, shipping or storage damage, and mechanisms or electrical components of the image forming apparatus.

The cover 112, in an example, includes elements or features that communicate with the image forming apparatus. The cover 112 includes areas or features that assist in engaging, holding or coupling communication elements or electronic elements on the cover 112. In some embodiments the cartridge 100 includes a chip holder 113, and the chip holder 113 retains a chip used in communicating with corresponding features in the image forming apparatus. The chip holder 113 is, for example, a fitting formed in or with the cover 112 that includes a recess for holding or retaining a computer chip. The chip holder 113, in another example, is a protrusion, extension or addition formed or coupled with the cover 112. The chip holder 113 is located at any position corresponding with a communication portion of the image forming apparatus. For example, the chip holder 113 is located at a proximal portion 114*a* of the cover 112. The chip holder 113, in another example, is located on at least one longitudinally extending side 114*c* of the cover 112.

The cover 112, in an example, also includes identification features 115 such as lockouts, protrusions, or recesses. Such identification features 115 are known to be formed with, such as by molding, the cover 112. The identification features 115 are also known to be additions added to the cover 112 after molding or otherwise forming the cover 112. The identification features 115 include, for example, lockouts that identify regions in that the cartridge 100 is designed for use. The identification features 115 also indicate, for example, the color of powder contained within the cartridge 100. The identification features 115, in another example, also otherwise identify the type of cartridge 100 or machine that the cartridge 100 is designated.

The cover 112 also includes engagement features, such as features 117*a* or 117*b*, to properly align the cartridge 100 in the machine. Engagement features 117*a*, 117*b* include, for example, grooves, protrusions, indents, projections, recesses, pins, rails or other components that assist in aligning the cartridge 100 within the image forming apparatus. The engagement features 117*a* and 117*b* also includes grooves, protrusions, indents, projections, recesses, pins, rails or other components that, for example, assist in coupling or attaching the cover 112 to the cartridge 100. For example, as illustrated in FIG. 2B, cartridge-cover engagement features 117*c* are be positioned on or in the cover 112 at a position that assists the cover 112 being coupled or attached to the cartridge body 102. In an example, the cartridge-cover engagement features 117*c* are formed or disposed on the cover 112 at a distal end 114*b* of the cover 112. In another example, the cartridge-cover engagement features 117*c* can be formed or disposed along lateral sides 114*c*.

Figure 3A:
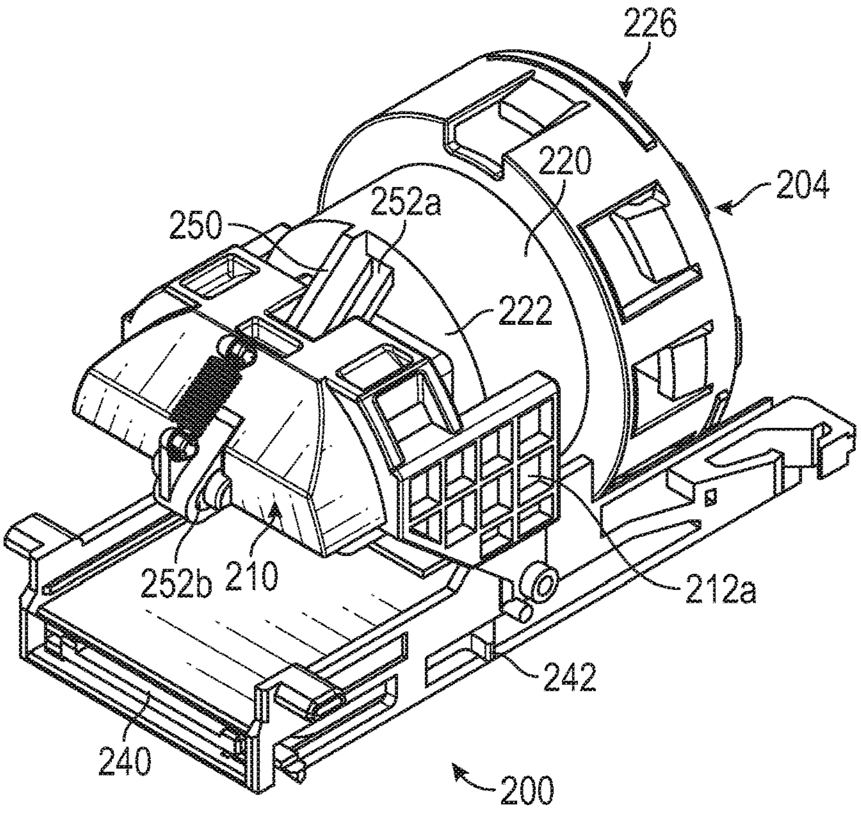
FIGS. 3A and 3B illustrate a cartridge dispense mechanism.
Figure 3B:
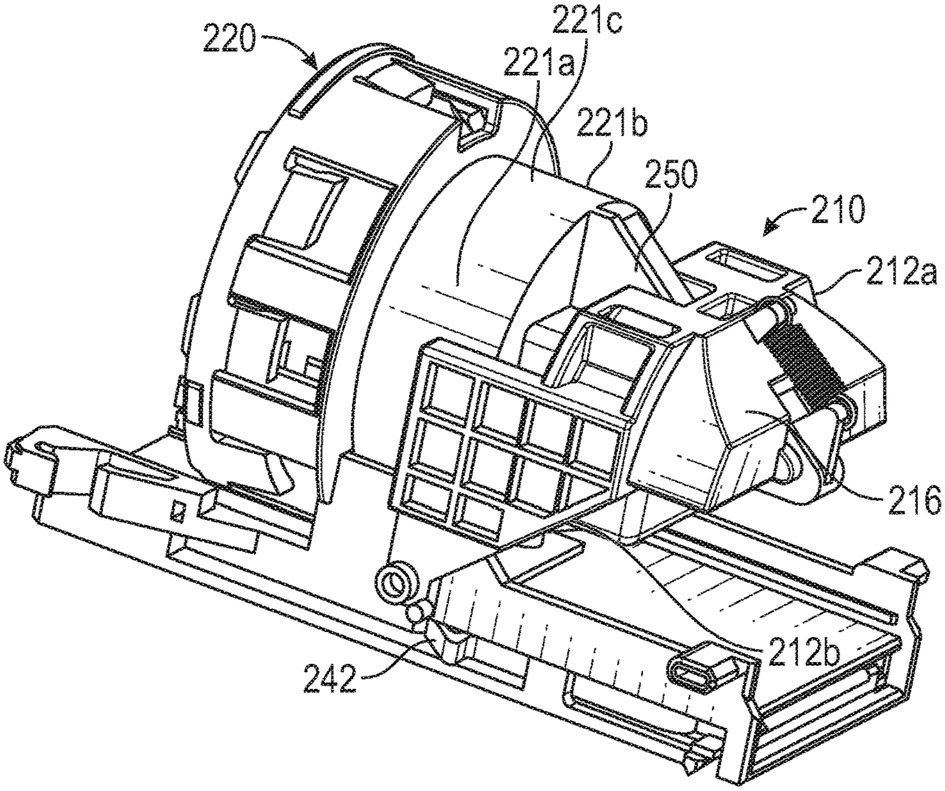

The cover 112 can protect any components internal of the cover 112. The components internal of the cover 112, as will be discussed below and illustrated in FIGS. 3A and 3B, are components or elements that are disposed external of the cartridge body 102. For example, components internal of the cover 112 includes at least a dispense mechanism 200. The dispense mechanism 200 includes, for example, dispense body 220 and a coupling mechanism 210. The cover 112, in an example, surrounds, encases, wraps around, envelops, or similarly contains at least a portion of the dispense body 220 and with coupling mechanism 210. In another example, the cover 112 surrounds the dispense body 220 including the top 221*c* and sides 221*a*, 221*b* of the dispense body 220 and the coupling mechanism 210.

The dispense mechanism 200 includes a container side opening 204 configured to engage with the opening of the cartridge body 102. In an example, the dispense body 220 couples with the container side opening 204 by snap-fit, screwing, interlocking elements, or the like. The dispense body 220 is closed with a front surface 222, for example, to retain powder within the dispense body 220 during use.

Figure 4:
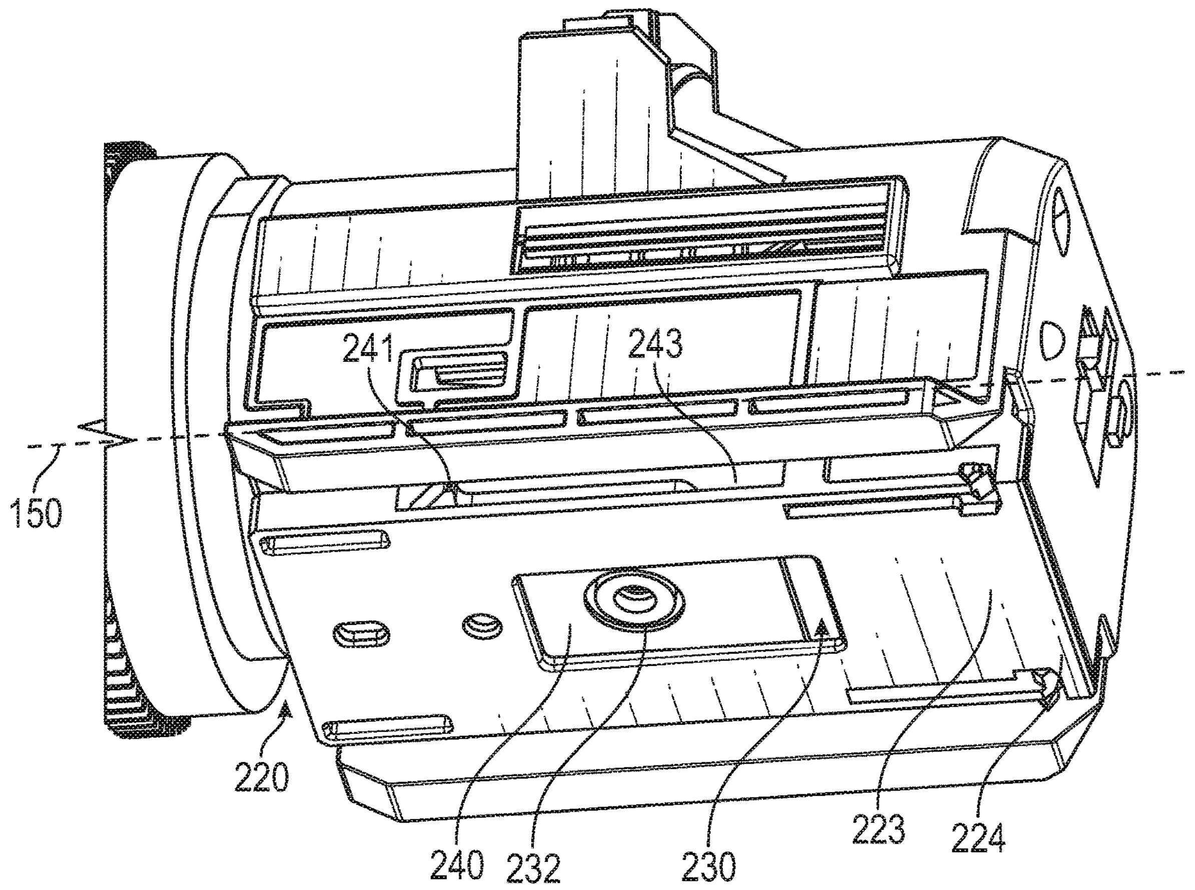
FIG. 4 illustrates a perspective bottom view of the cartridge interface.

The dispense body 220 includes a dispense opening 230 at a location, for example, different from the container side opening 204. As illustrated in FIG. 4, the dispense opening 230 is, for example, in a bottom surface 224 of the dispense body 220 and sized to correspond with a powder receiving area of the image forming apparatus once the cartridge 100 is installed. In an example, the bottom surface 224 is a separate feature from the dispense body 220 that is coupled to the dispense body 220. In another example, the bottom surface 224 is a component of the dispense body 220. The dispense opening 230 optionally includes a profile (e.g., shape, size or the like) that corresponds to the powder receiving area of the image forming apparatus. For example, the dispense opening 230 is in various examples rectangular, square, circular, oval, oblong, or any other suitable shape to permit communication with the powder receiving area. The dispense opening 230 extends at an angle (e.g., including but not limited to orthogonally or obliquely) with respect to the rotational axis 150 of the cartridge 100 through the bottom surface 224 and toward the dispense body 220. In some examples, the dispense opening 230 extends from an outer surface 223 of the bottom surface 224 to a cavity 226 (see FIG. 2B) of the dispense body 220. The cavity 226 receives powder from the cartridge body 102. Referring again to FIG. 4, the dispense opening 230 also includes, for example, a dispense port 232 that permits powder to pass from the cavity 226 of the cartridge 100 and into the image forming apparatus.

The dispense opening 230 and dispense port 232 are closed, for example, with a closing mechanism 240, such as a shutter, door, or other similar device (hereinafter "shutter"). The shutter 240 is configured to engage with corresponding features in the image forming apparatus. For example, the shutter 240 engages with the image forming apparatus via shutter engagement elements 241 such as with protrusions, recesses, or the like. The shutter engagement elements 241 are, for example, on at least one side of the shutter 240. Other locations of shutter engagement elements 241 are also contemplated, for example at a front or rear side of the shutter 240. For example, when the shutter 240 is properly engaged with the image forming apparatus, the shutter 240 is moved to open the cartridge 100 and provide a path for powder to be dispensed from the cartridge 100. In an example, the shutter 240 is moved longitudinally (e.g., in a similar direction to the length of the cartridge 100). The shutter 240, in another example, is rotated open or moves laterally with respect to the longitudinal direction of the cartridge 100. The shutter 240 movement is guided, for example with engagement between the shutter engagement elements 241 and at least one shutter groove, guide, rail, channel, track or the like 243 (see FIG. 4). The shutter grooves 243 extend, for example, in the direction the shutter 240 travels during operation to open and close.

Figure 5A:
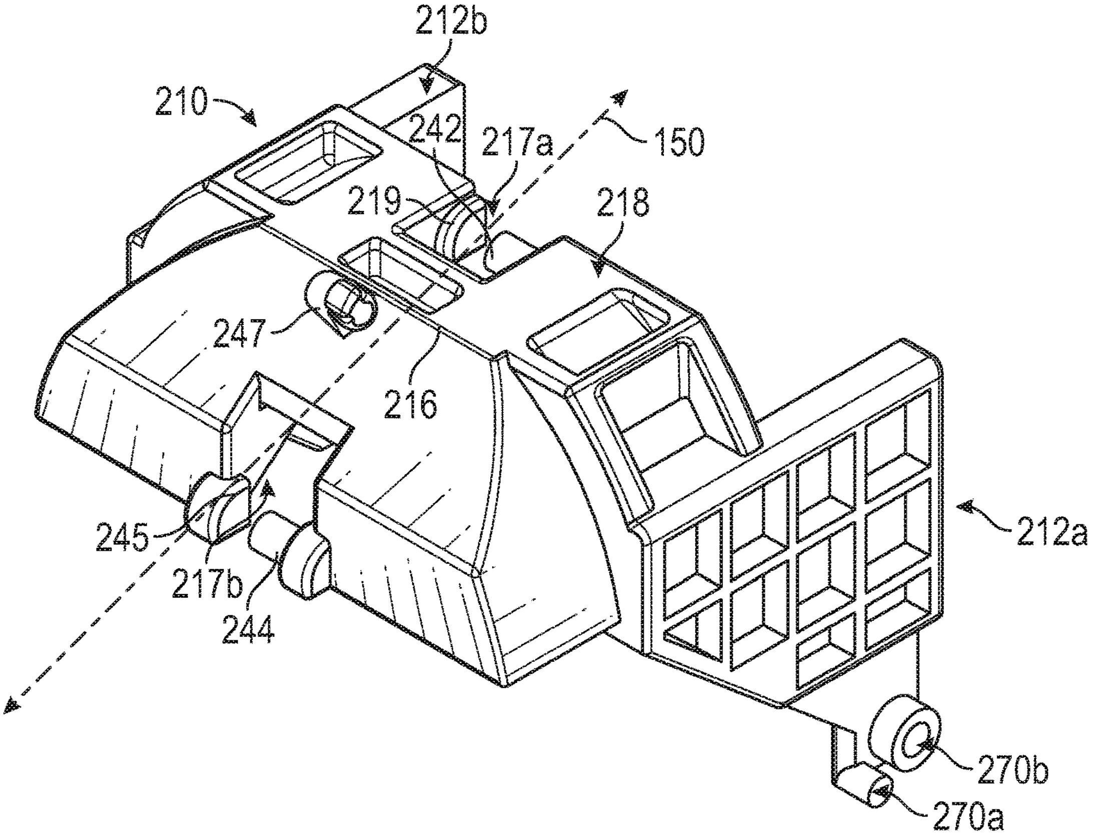
FIGS. 5A and 5B illustrate a coupling mechanism of the cartridge dispense mechanism.
Figure 5B:
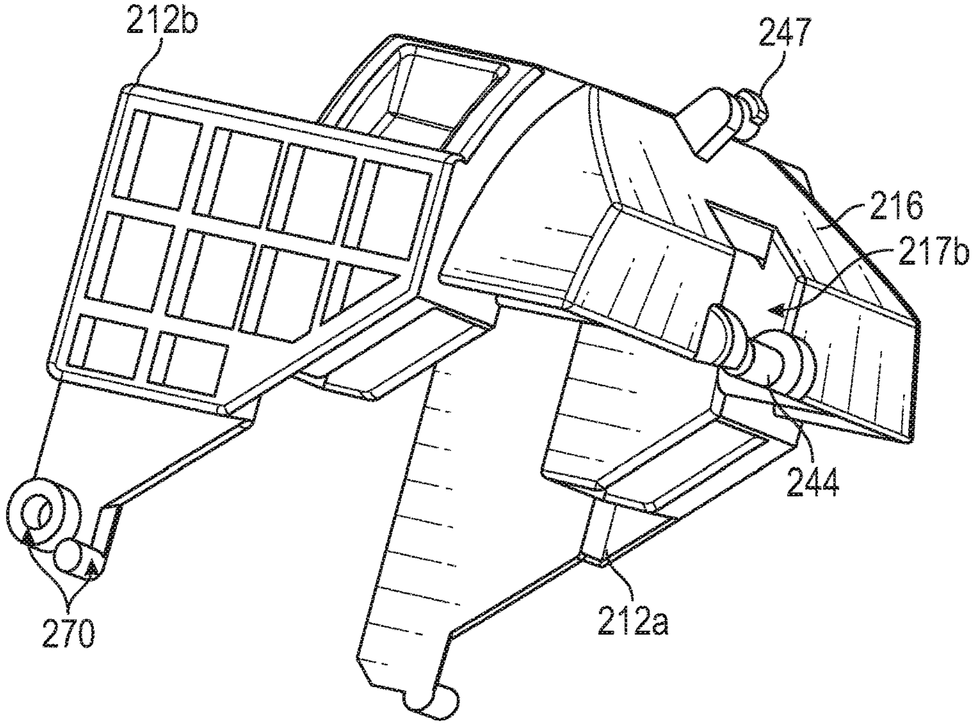

Referring now to FIGS. 5A and 5B, one example of a coupling mechanism 210 of the dispense body 220 (FIGS. 3A, 3B) is shown. In an example, the coupling mechanism 210 is a unitary molded or formed piece. In another example, the coupling mechanism 210 includes several pieces fit or assembled together.

In an example, the coupling mechanism 210 is removably coupled with the dispense body 220. In another example, the coupling mechanism 210 is secured to the dispense body 220. In such an example, the coupling mechanism 210 is coupled with the dispense body 220 with cooperation between shuttles 242 and 244 and grooves 250*a* and 250*b*. In another example, the coupling mechanism 210 is coupled along both sides 221*a* and 221*b* of the dispense body 220, each coupling member side portion 212*a*, 212*b* is optionally identical, substantially similar or different in design. In the example shown in FIGS. 3A and 3B, the coupling mechanism 210 hugs, brackets, pinches, grasps the dispense body 220 (e.g., collectively, couples) with coupling member side portions 212*a* and 212*b* (e.g., legs, arms or the like extending from an intermediate portion of the coupling mechanism).

The coupling mechanism 210, in an example, has a bridge 216 that extends across a portion of the dispense body 220. In one example, the bridge 216 connects the coupling member side portions 212*a* and 212*b* together. The bridge 216 extends over or across a portion, or all of, of the proximal end 206 of the coupling mechanism 210. In another example, the bridge 216 extends over or across an area proximate to the proximal end 206. As illustrated in the example shown in FIGS. 3A and 3B, the bridge 216 extends over or across an area proximate to the proximal end 206.

As illustrated in FIGS. 5A and 5B, the bridge 216 includes an upper shuttle 242 configured for movable coupling with a corresponding feature of the dispense body 220. In one example, the upper shuttle 242 includes a pin, rail or the like projecting transverse relative to rotational axis 150 of the cartridge 100. The upper shuttle 242 extends laterally relative to the rotational axis 150, for instance at an angle orthogonal or oblique to the rotational axis 150. In another example, the upper shuttle 242 is housed within an upper cavity 217*a* formed in a top, or upper, portion 218 of the bridge 216. Optionally, a brace protrusion 219 in the upper cavity 217*a* opposes the upper shuttle 242. As discussed herein, the brace protrusion 219 (where present) assists in controlling lateral movement of the coupling mechanism 210 when in use. For example, the brace protrusion 219 constrains lateral movement of the coupling mechanism 210 and guides the coupling mechanism 210 to follow cooperative movement between the upper shuttle 242 and the groove 250*a*.

Further, as illustrated in FIG. 5B the bridge 216 optionally includes a lower shuttle 244 configured for movable coupling with a corresponding feature of the dispense body 220. In one example, the lower shuttle 244 includes a pin, rail or the like projecting transverse relative to rotational axis 150 of the cartridge 100. The lower shuttle 244 extends laterally relative to the rotational axis 150, for instance at an angle orthogonal or oblique to the rotational axis 150. In another example, the upper shuttle 244 is housed within a lower cavity 217*b* formed in a bottom, or lower, portion of the bridge 216. Optionally, a brace protrusion 245 in the lower cavity 217*b* opposes the lower shuttle 244. As discussed herein, the brace protrusion 245 (where present) assists in controlling lateral movement of the coupling mechanism 210 when in use. For example, the brace protrusion 245 constrains lateral movement of the coupling mechanism 210 and guides the coupling mechanism 210 to follow cooperative movement between the lower shuttle 244 and the groove 250*b*.

Returning to FIGS. 3A and 3B, the upper shuttle 242 and the lower shuttle 244 fit within an upper receiving groove 252*a* and the lower receiving groove 252*b*, respectively, of the dispense body 220. Hereinafter, groove can refer to, but is not limited to, groove, guide, rail, channel, track or the like. The upper receiving groove 252*a*, for example, is formed in or with a protrusion 250 extending in a proximal direction of the cartridge 100 from the closed front face 222 of the dispense body 220. The lower receiving groove 252*b* extends in a proximal direction of the cartridge 100, for example, from the closed front face 222. The upper receiving groove 252*a* and the lower receiving groove 252*b* provide an example of a path for the upper shuttle 242 and the lower shuttle 244 to travel during use. The upper shuttle 242 alone or in combination with the lower shuttle 244 provides, for example, a track or path that guides or directs the coupling mechanism 210 to move substantially linearly when in use, as discussed further below.

Figure 6:
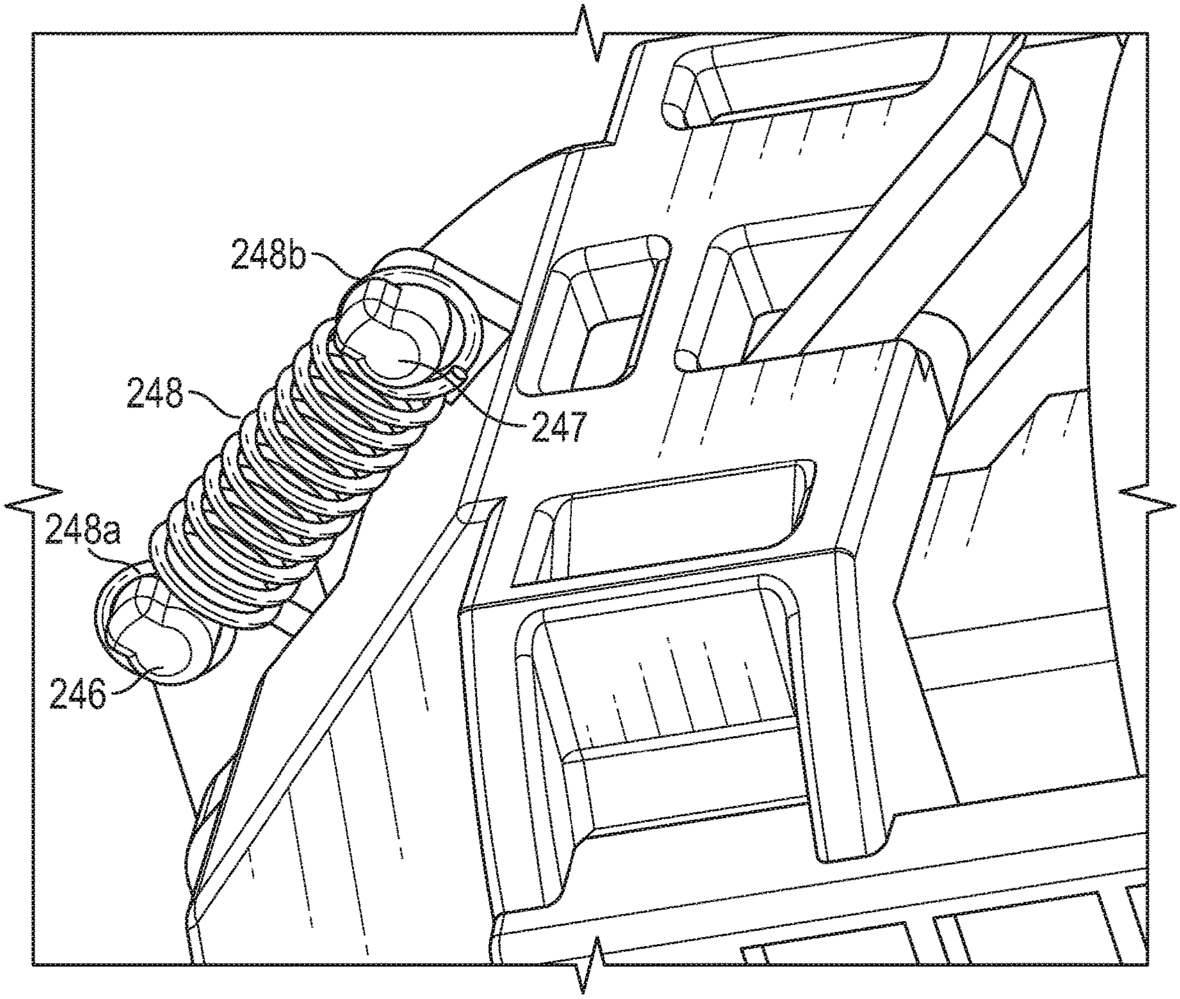
FIG. 6 illustrates is a detailed view of the dispense mechanism having a biasing member.

In an example, as illustrated in FIG. 6, a biasing member 248 controls the movement of the coupling mechanism 210 during use. For example, on each of the dispense body 220 and the coupling mechanism 210 there is dispense body biasing member mount 246 and a coupling biasing member mount 247, respectively. The dispense body biasing member mount 246 is, for example, a protrusion or extension on the dispense body 220. In another example, the dispense body biasing member mount 246 is a recess or the like that provides an attachment or coupling point for the biasing member 248 on the dispense body 220. The coupling biasing member mount 247 is, for example, a protrusion or extension on the coupling mechanism 210. In another example, the coupling biasing member mount is a recess or the like that provides an attachment or coupling point for the biasing member 248 on the coupling mechanism 210.

The dispense biasing member mount 246 and the coupling mechanism mount 247, in an example, are aligned so the biasing member 248 is coupled with one end 248*a* of the biasing member 248 coupled to the dispense biasing member mount 246 and another end 248*b* of the biasing member 248 coupled to the coupling mechanism mount 247. In an example, the biasing member 248 assists in controlling the movement of the coupling mechanism 210 or to assist in minimizing displacement of the coupling mechanism 210 in a lateral direction.

As illustrated in the examples shown in FIGS. 5A and 5B, the coupling mechanism 210, includes features that attach, couple, or engage with corresponding elements in the image forming apparatus. For example, the coupling mechanism 210 has a plurality of coupling extensions 270 or protrusions attached to, protruding from, or engaged with at least one coupling member side portion, 212*a* or 212*b* (hereinafter "coupling extensions"). In an example, the coupling extensions 270 can be pins, posts, bosses, pegs or any shape or configuration suitable for the purpose. In an example, the coupling extensions 270 are cylindrical or elliptical cylinders, polygonal, or the like (as illustrated the examples in FIGS. 7A and 7B). In an example, the coupling extensions 270 can be a combination of profiles. The profile of the coupling extensions 270 provide a surface 271 that the elements of the image forming apparatus rest or engage. The coupling extensions 270, for example, are configured for cooperate engagement with the corresponding elements of the image forming apparatus.

Figure 7A:
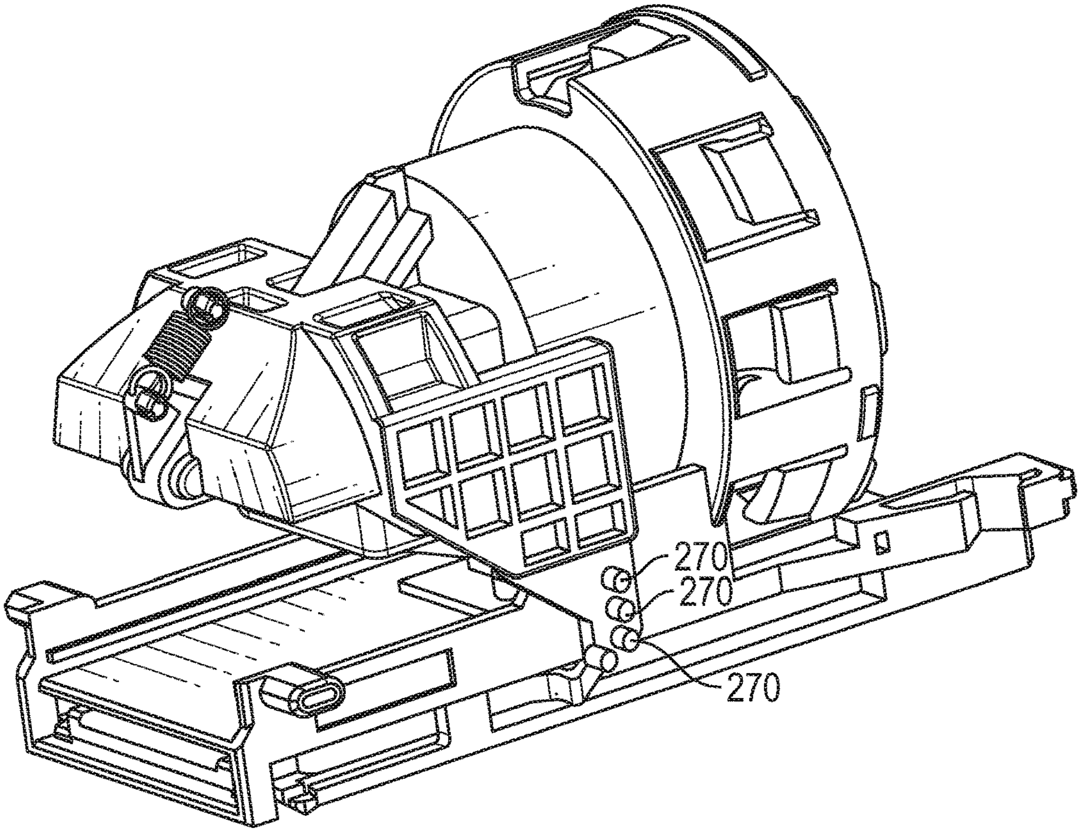
FIG. 7A illustrates a cartridge dispense mechanism.
Figure 7B:
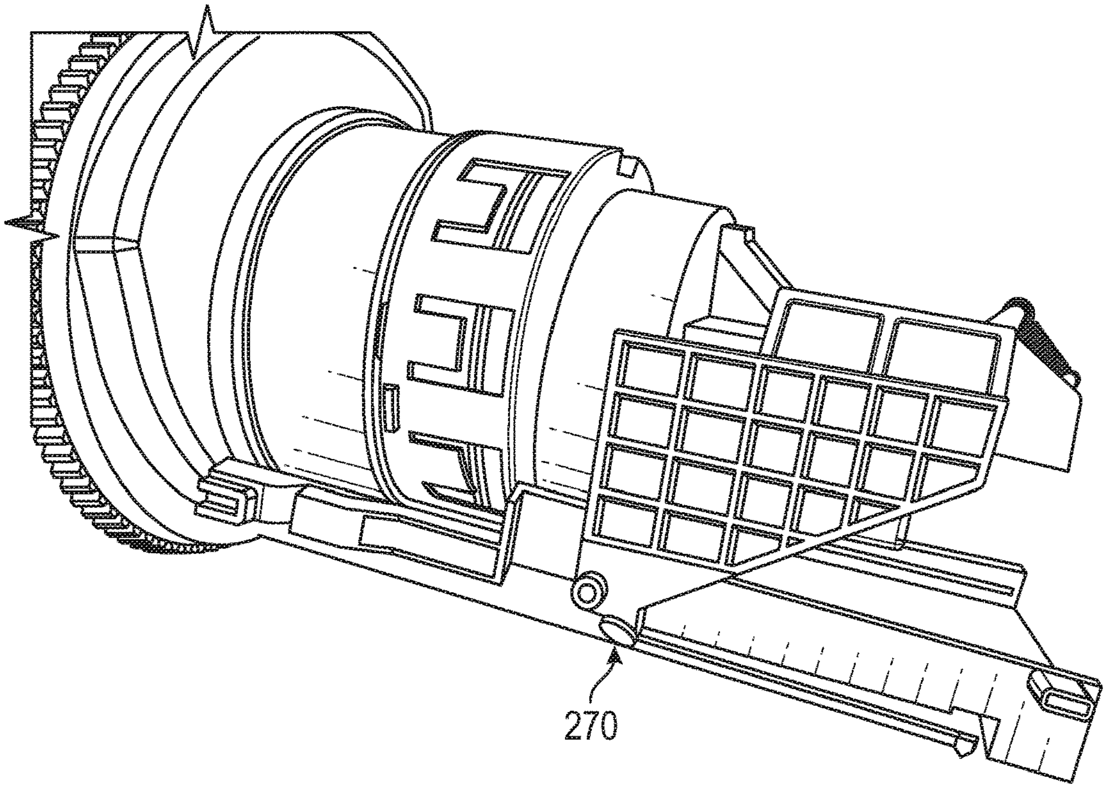
FIG. 7B illustrates a cartridge dispense mechanism.

While there are two coupling extensions 270 shown in the examples illustrated in FIGS. 5A and 5B there can be two, three, four (as illustrated in FIG. 7A) or more coupling extensions 270 on, or associated with, at least one coupling member side portion 212*a* or 212*b*. As illustrated in the example shown in FIGS. 5A and 5B, there are at least two coupling extensions 270*a* and 270*b* with a first coupling extension 270*a* placed at a lower and proximal position, relative to the coupling mechanism 210. The second coupling extension 270*b* is, for example, at a position relatively higher than the lowest point of the first coupling extension 270*a* and distally placed.

In an example, the coupling extensions 270 are arranged so the corresponding elements in the image forming apparatus rest on, between, or against at least one of the plurality of coupling extensions 270 without the corresponding elements of the image forming apparatus becoming disengaged during use. For example, if there are two coupling extensions 270 the corresponding elements in the image forming apparatus can rest on or between a first coupling extension 270*a* and a second coupling extension 270*b*. In another example, the corresponding elements in the image forming apparatus can pass over the first coupling extension 270*a* and rest against the second coupling extension 270*b*.

Figure 8:
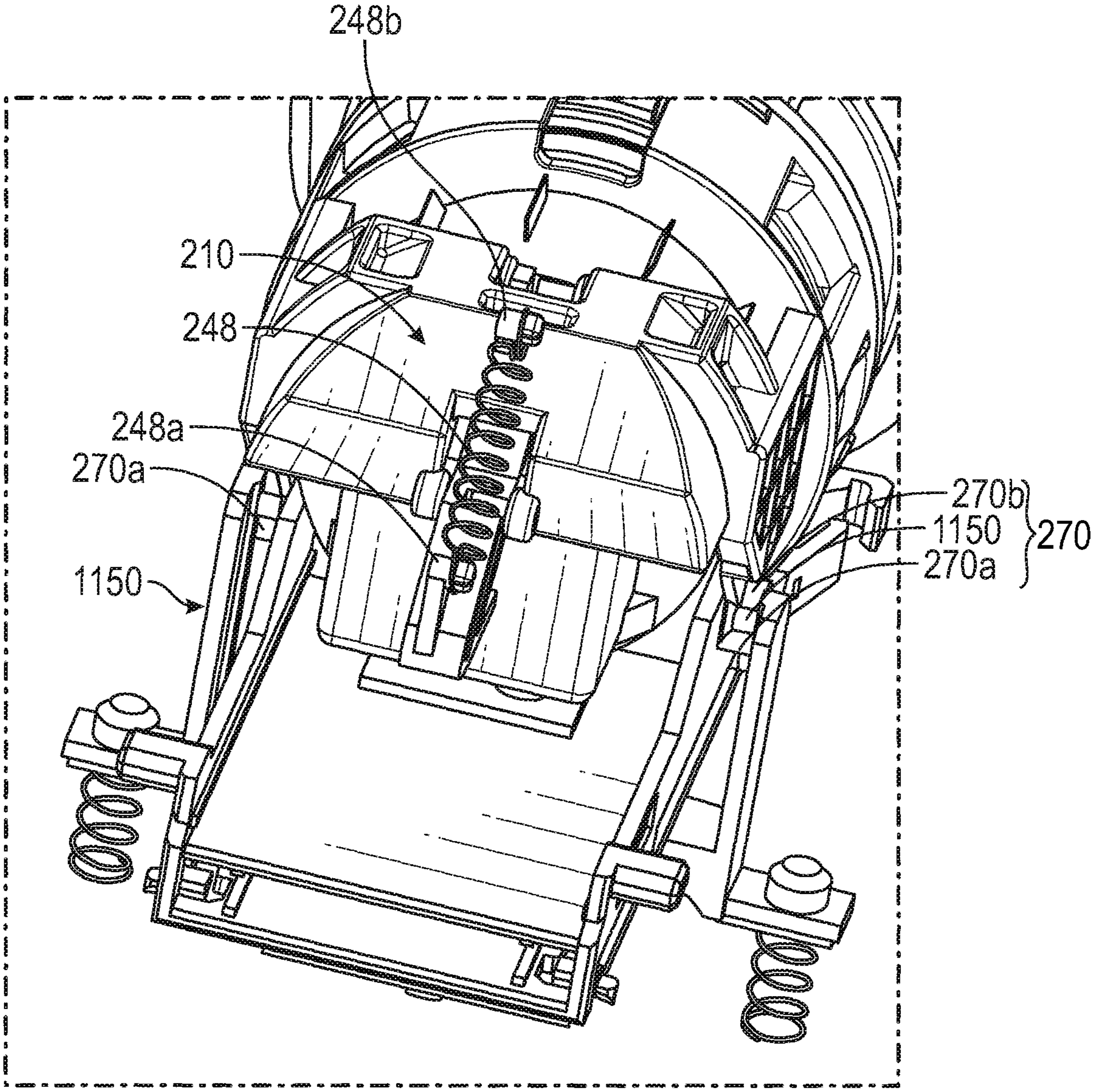
FIG. 8 illustrates an example of a cartridge dispense mechanism and corresponding lift portion of an image forming apparatus.

As illustrated in FIG. 8, the coupling extensions 270*a*, 270*b* are designed to engage with a lift component 1150 of the image forming apparatus. The coupling extensions 270*a* and 270*b* are, for example, configured to transform longitudinal movement of the cartridge 100 into lifting movement of the coupling mechanism 210 relative to the cartridge 100 (e.g., from lower position to a higher position). The coupling extensions 270*a*, 270*b*, in an example, also capture the lift component 1150 and prevent travel of the lift component 1150 beyond the first coupling extension 270*a*.

Figure 9A:
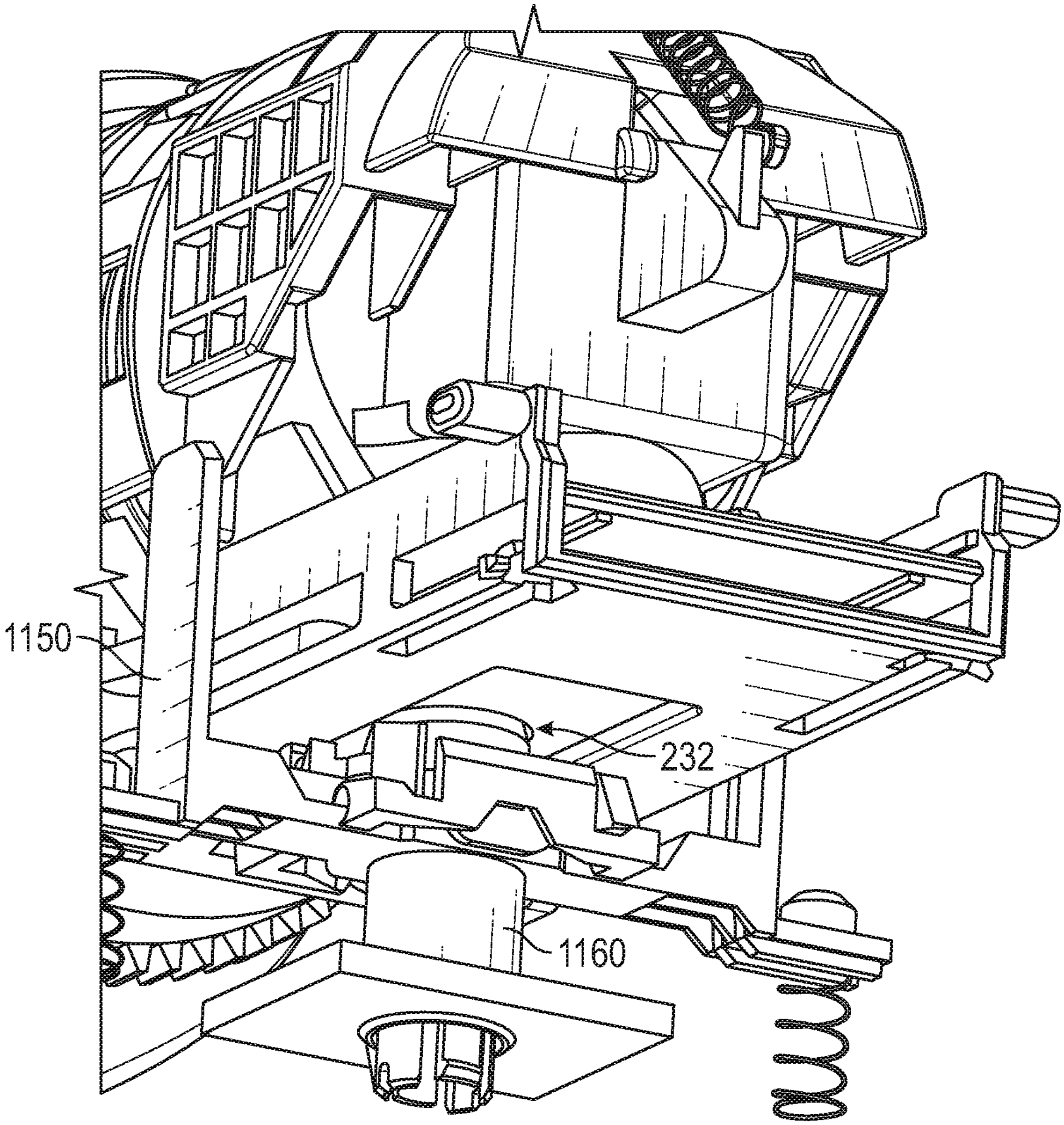
FIG. 9A illustrates an example of the image forming apparatus powder receiver coupled with the cartridge dispense mechanism.
Figure 9B:
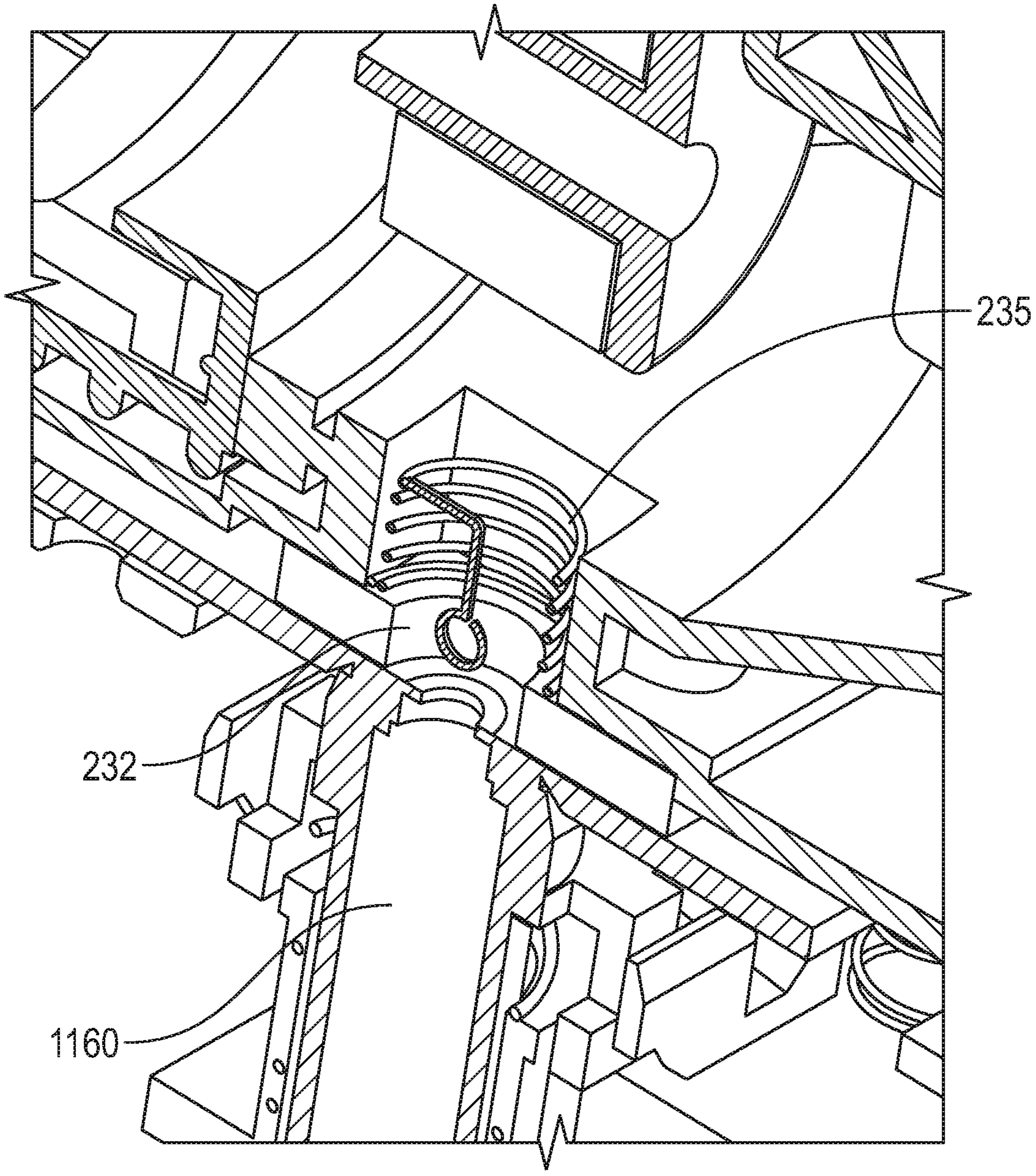
FIG. 9B illustrates a cross section of an example of the image forming apparatus powder receiver and the powder container dispense port.

As illustrated in the examples in FIGS. 9A and 9B, the lift component 1150 translates the movement to a powder receiver 1160 and brings the powder receiver 1160 into engagement the dispense port 232. When the dispense port 232 is open powder is, for example, exhausted or dispensed from the cartridge 100 and into the powder receiver 1160. In an example, a powder break-up mechanism 235 is disposed, placed or coupled within the dispense port 232. The powder break-up mechanism 235 is, for example, a coil spring, a mylar sheet, or any similar device that is configured to minimize powder blocking or accumulating in the dispense port 232.

Figure 10A:
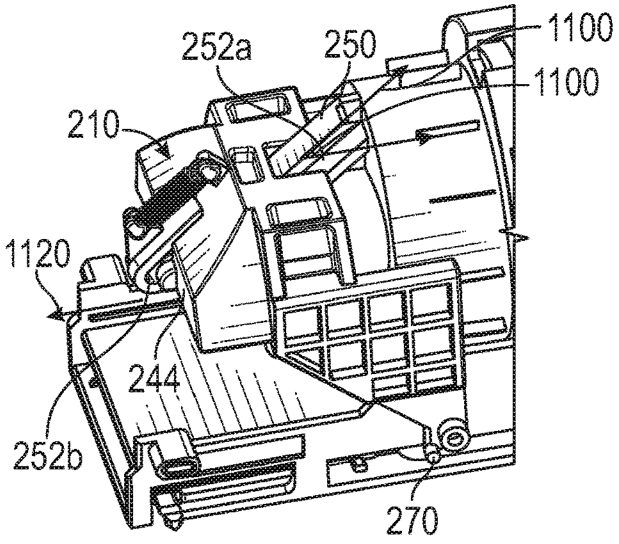
FIGS. 10A-10C illustrates an example of the motion of a coupling mechanism relative to a dispense mechanism.
Figure 10B:
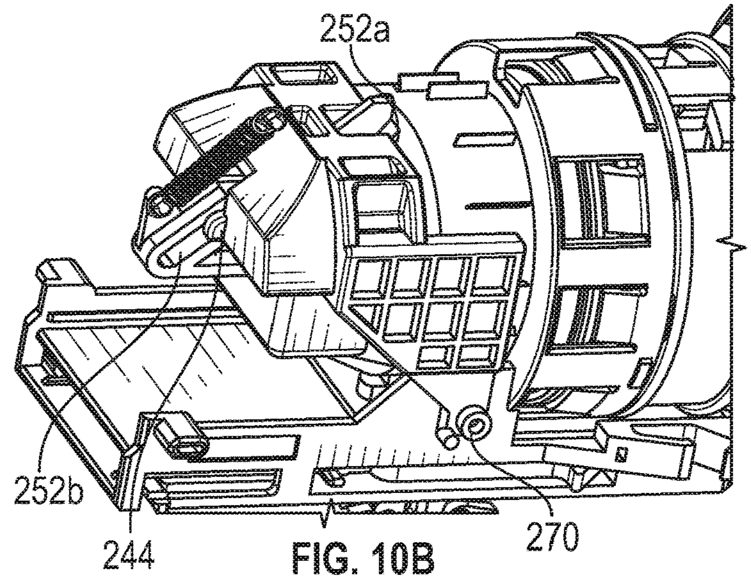
Figure 10C:
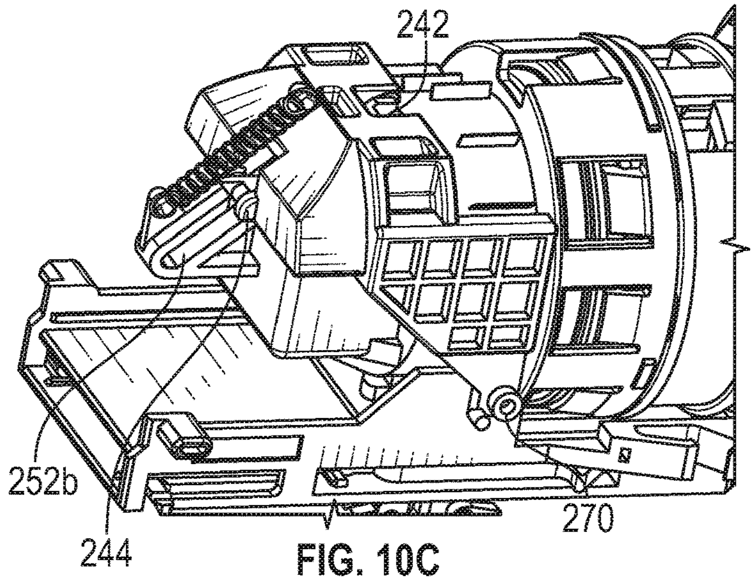

FIGS. 10A, 10B and 10C illustrate a method of the cartridge 100 being installed into the image forming apparatus. As the cartridge 100 is inserted into the image forming apparatus as indicated by the insertion direction 1120, the hopper 1000 (illustrated in FIG. 1, FIG. 9A and FIG. 9B) and the coupling extensions 270 engage or couple with the lift component 1150. As the cartridge 100 is further inserted into the hopper 1000 and image forming apparatus, the coupling between the lift mechanism and the coupling mechanism 210, causes the coupling mechanism to begin to travel in the direction of the upper groove 252*a* and the lower groove 252*b* at, for example, an inclined angle 1100 relative to the container movement and longitudinal axis 150. For example, the coupling mechanism 210 is moved in a direction corresponding with the upper groove 252*a* and the lower groove 252*b*. The upper groove 252*a*, for example, is formed on or in at least one side of the protrusion 250 at an oblique or an inclined angle 1100 on at least one side of the protrusion 250. The upper shuttle 242, in an example, is slidably coupled within the at least one groove 252*a* and travels along the at least one groove 252*a* on the dispense mechanism 200 to assist in guiding the coupling mechanism and translating a lifting motion to the coupling extensions 270.

As illustrated in FIG. 10B, after the cartridge 100 is further advanced, a force from the corresponding portion (i.e. lift component 1150) in the image forming apparatus against the coupling extension 270 is, for example, translated to the upper shuttle 242. The upper shuttle 242 then, in an example, is movably coupled such that it travels along or within the groove 252*a*. The upper shuttle 242, in an example, is slidably received within the groove of the laterally extending guide. If the cartridge has a lower shuttle 244, the lower shuttle 244 travels along or within the lower groove 252*b*. In an example, the upper shuttle 242 and lower shuttle 244 travel along the inclined upper groove 252*a* and the lower groove 252*b* and elevates, lifts or raises the coupling extension 270 on the portion of the coupling mechanism 210 below the rotational axis 150 of the cartridge 100. The movement of the coupling extension 270, for example, translates movement to the corresponding portion (i.e. lift component 1150) in the image forming apparatus that is coupled with the coupling extension 270 in the direction of movement 1102, such as in an upward direction. As the corresponding portion (i.e. lift component 1150) of the image forming apparatus is raised, for example, the powder receiving feature of the image forming apparatus is brought in close relationship with the dispense opening 230 and the dispense port 232 of the cartridge 100, as illustrated in FIGS. 9A and 9B.

In an embodiment, when the cartridge 100 is removed from the machine by withdrawing the cartridge 100 from the image forming apparatus in the direction reverse from the insertion direction 1120, the upper shuttle 242, and optionally the lower shuttle 244, travels downward or in the reverse direction along the upper groove 252*a*, and optionally the lower groove 252*b*. The coupling extensions 270 lower the corresponding feature (i.e. lift component 1150) in the image forming apparatus and the powder receiving feature of the image forming apparatus. In an example, the powder receiving feature is no longer coupled with or proximate to the dispense port.

Various Notes and Aspects

Aspect 1 can include a powder cartridge including a cartridge having an opening at a proximal end and a cartridge interface coupled with the cartridge at the proximal end. The cartridge interface includes a cover, a dispense mechanism and a coupling mechanism. The dispense mechanism includes a cartridge side opening in communication with the opening at the proximal end of the cartridge, a dispense opening configured for communication with a powder receiving component of an image forming apparatus, and a groove protrusion having an inclined groove on at least one side. The coupling mechanism is coupled with the dispense mechanism. The coupling mechanism includes a coupling extension connected to the coupling mechanism and at least one shuttle configured for movable coupling along the groove protrusion. The coupling mechanism is configured to translate along the inclined groove and elevate relative to the dispense mechanism with installation of the powder cartridge into the image forming apparatus.

Aspect 2 can include, or can optionally be combined with the powder cartridge of Aspect 1, to optionally include the groove protrusion on a front surface of the dispense mechanism.

Aspect 3 can include, or can optionally be combined with the powder cartridge of one or any combination of Aspects 1 or 2 to optionally include the at least one shuttle extending laterally from the coupling mechanism.

Aspect 4 can include, or can optionally be combined with the powder cartridge of one or any combination of Aspects 1-3 to optionally include the at least one shuttle is slidably received along a laterally extending guide.

Aspect 5 can include, or can optionally be combined with the powder cartridge of one or any combination of Aspects 1-4 to optionally include the groove protrusion including a laterally extending guide.

Aspect 6 can include, or can optionally be combined with the powder cartridge of one or any combination of Aspects 1-5 to optionally include the coupling extension is configured for releasably coupling with a lift component of the image forming apparatus.

Aspect 7 can include a cartridge interface on a developer cartridge body comprising a cover, a dispense mechanism, a coupling mechanism, a biasing force mount and a biasing member. The cover including a chip holder and an image forming apparatus engagement. The dispense mechanism including a dispense opening and a dispense port configured for communication with a powder receiving component of the image forming apparatus. The dispense mechanism also including a shutter. The dispense mechanism further includes a groove protrusion having at least one inclined groove. The coupling mechanism includes at least two coupling extensions extending from at least one outer side surface of the coupling mechanism. The at least two coupling extensions extend from a lower portion of the at least one outer side surface coupling mechanism. The at least two coupling extensions are disposed on the coupling mechanism with a first coupling extension positioned above a center of a second coupling extension and the second coupling extension at a more forward position than the first coupling extension; and at least one shuttle extending from the coupling mechanism and toward the groove protrusion. The coupling mechanism is configured to translate along the at least one inclined groove and elevate relative to the dispense mechanism with installation of the developer cartridge body to the image forming apparatus. The biasing force mount on the coupling mechanism and the dispense mechanism. The biasing member coupled to the biasing force mount.

Aspect 8 can include, or can optionally be combined with the cartridge interface on a developer cartridge body including groove protrusion is on a front surface of the dispense mechanism.

Aspect 9 can include, or can optionally be combined with the cartridge interface on a developer cartridge body of one or any combination of Aspects 7 or 8 to optionally include the groove protrusion is obliquely angled.

Aspect 10 can include, or can optionally be combined with the cartridge interface on a developer cartridge body of one or any combination of Aspects 7-9 to optionally include the at least one groove is at an inclined angle.

Aspect 11 can include, or can optionally be combined with the cartridge interface on a developer cartridge body of one or any combination of Aspects 7-10 to optionally include the groove protrusion is laterally extending.

Aspect 12 can include, or can optionally be combined with the cartridge interface on a developer cartridge body of one or any combination of Aspects 7-11 to optionally include the shuttle extending laterally from the coupling mechanism.

Aspect 13 can include, or can optionally be combined with the cartridge interface on a developer cartridge body of one or any combination of Aspects 7-12 to optionally include the shuttle is slidably received within the groove.

Aspect 14 can include, or can optionally be combined with the cartridge interface on a developer cartridge body of one or any combination of Aspects 7-13 to optionally include the biasing member coupled on one end to the biasing force mount of the coupling mechanism and on another end to the biasing force mount of the dispense mechanism.

Aspect 15 can include, or can optionally be combined with the cartridge interface on a developer cartridge body of one or any combination of Aspects 7-14 to optionally include the coupling extension is configured for releasably coupling with a lift component of the image forming apparatus.

Aspect 16 can include, or can optionally be combined with the cartridge interface on a developer cartridge body of one or any combination of Aspects 7-15 to optionally include the coupling extensions are posts.

Aspect 17 can include a method of installing a powder cartridge in an image forming apparatus comprising inserting a cartridge interface of the cartridge into a hopper of the image forming apparatus. The cartridge interface including a dispense mechanism coupled to a coupling mechanism. The method includes coupling a plurality of coupling extensions disposed on at least one side of the coupling mechanism with a lift component of the image forming apparatus. The method includes advancing the cartridge further into the hopper. The method includes translating an inclined movement from the coupling of the lift component and the plurality of coupling extensions to the coupling mechanism and guiding the coupling mechanism and the plurality of coupling extensions in an inclined direction.

Aspect 18 can include, or can optionally be combined with the method of installing a powder cartridge having an upper groove and a lower groove; and the coupling mechanism has an upper shutter slidably coupled in the upper groove and a lower shuttle slidably coupled in the lower groove.

Aspect 19 can include, or can optionally be combined with the method of installing a powder cartridge of one or any combination of Aspects 17 or 18 to optionally include the dispense mechanism has a groove protrusion extending laterally from a front surface of the coupling mechanism. Wherein the groove protrusion has at least one inclined groove; and wherein the coupling mechanism has at least one shuttle configured movably coupled within the at least one inclined groove.

Aspect 20 can include or can optionally be combined with the method of installing a powder cartridge limiting lateral movement of the coupling mechanism relative to the dispense mechanism. Wherein a biasing member coupled with the dispense mechanism and the coupling mechanism limits the lateral movement.

The above description includes references to the accompanying drawings, which form a part of the detailed description. The drawings show, by way of illustration, specific embodiments in which the invention can be practiced. These embodiments are also referred to herein as "aspects" or "examples." Such aspects or example can include elements in addition to those shown or described. However, the present inventors also contemplate aspects or examples in which only those elements shown or described are provided. Moreover, the present inventors also contemplate aspects or examples using any combination or permutation of those elements shown or described (or one or more features thereof), either with respect to a particular aspects or examples (or one or more features thereof), or with respect to other Aspects (or one or more features thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

The above description is intended to be illustrative, and not restrictive. For example, the above-described aspects or examples (or one or more aspects thereof) may be used in combination with each other. Other embodiments can be used, such as by one of ordinary skill in the art upon reviewing the above description. The Abstract is provided to comply with 37 C.F.R. § 1.72 (b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as aspects, examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A powder cartridge comprising:

a cartridge having an opening at a proximal end; and a cartridge interface coupled with the cartridge at the proximal end, the cartridge interface includes:

a cover;

a dispense mechanism, the dispense mechanism includes:

a cartridge side opening in communication with the opening at the proximal end of the cartridge;

a dispense opening configured for communication with a powder receiving component of an image forming apparatus; and a protrusion; and a coupling mechanism coupled with the dispense mechanism, the coupling mechanism includes:

a coupling extension connected to a portion of the coupling mechanism; and at least one shuttle configured for movable coupling along the protrusion;

wherein the coupling mechanism is configured to translate along the protrusion by way of the shuttle and elevate relative to the dispense mechanism with installation of the powder cartridge into the image forming apparatus.

2. The powder cartridge of claim 1, wherein the protrusion has an inclined rail on at least one side; and wherein the protrusion is on a front surface of the dispense mechanism.

3. The powder cartridge of claim 1, wherein the at least one shuttle extends laterally from the coupling mechanism into a groove on the protrusion.

4. The powder cartridge of claim 1, wherein the at least one shuttle is slidably received along a laterally extending groove on the protrusion.

5. The powder cartridge of claim 1, wherein a groove on the protrusion includes a laterally extending guide.

6. The powder cartridge of claim 1, wherein the coupling extension is configured for releasably coupling with a lift component of the image forming apparatus.

7. A cartridge interface configured for coupling with a powder cartridge body comprising:

a cover including:

a chip holder; and an image forming apparatus engagement;

a dispense mechanism including:

a dispense opening coupled with a powder cartridge body and a dispense port configured for communication with a powder receiving component of an image forming apparatus;

a shutter configured to cover the dispense port; and a protrusion;

a coupling mechanism including at least two coupling extensions extending from at least one outer side surface of the coupling mechanism;

wherein the at least two coupling extensions extend from a lower portion of at least one side surface of the coupling mechanism;

the at least two coupling extensions are disposed on the coupling mechanism with a first coupling extension positioned above a center of a second coupling extension and the second coupling extension distal to the first coupling extension; and at least one shuttle extending from the coupling mechanism and toward the protrusion;

wherein the coupling mechanism is configured to translate along the protrusion and elevate relative to the dispense mechanism with installation of the developer cartridge body to the image forming apparatus; and a biasing member coupled between the dispense mechanism and the coupling mechanism, the biasing member configured to bias the coupling mechanism toward a closed position.

8. The cartridge interface of claim 7, wherein the protrusion is on a front surface of the dispense mechanism.

9. The cartridge interface of claim 7, wherein the groove protrusion is obliquely angled.

10. The cartridge interface of claim 7, wherein the protrusion includes: at least one inclined groove is at an inclined angle.

11. The cartridge interface of claim 7, wherein the protrusion is laterally extending.

12. The cartridge interface of claim 7, wherein the at least one shuttle extends laterally from the coupling mechanism.

13. The cartridge interface of claim 7, wherein the at least one shuttle is slidably received within an inclined groove;

wherein the inclined groove is formed in the protrusion.

14. The cartridge interface of claim 7, further comprising the biasing member coupled on one end to the biasing force mount of the coupling mechanism and on another end to the biasing force mount of the dispense mechanism.

15. The cartridge interface of claim 7, wherein the at least two coupling extension are configured for releasably coupling with a lift component of the image forming apparatus.

16. The cartridge interface of claim 7, wherein the at least two coupling extensions are posts.

17. A method of installing a powder cartridge in an image forming apparatus comprising:

inserting a cartridge interface of the cartridge into a hopper of the image forming apparatus, the cartridge interface including a dispense mechanism coupled to a coupling mechanism;

coupling a plurality of coupling extensions disposed on at least one side of the coupling mechanism with a lift component of the image forming apparatus;

advancing the cartridge further into the hopper;

translating an inclined movement from the coupling of the lift component and the plurality of coupling extensions to the coupling mechanism; and guiding the coupling mechanism and the plurality of coupling extensions coupled with the lift component in an inclined direction;

wherein the inclined movement brings a dispense port in engagement with the receiving area of the image forming apparatus of the lift component.

18. The method of claim 17, wherein the dispense mechanism has an upper groove and a lower groove; and the coupling mechanism has an upper shutter slidably coupled in the upper groove and a lower shuttle slidably coupled in the lower groove.

19. The method of claim 17, wherein the dispense mechanism has a protrusion extending laterally from a front surface of the coupling mechanism;

wherein the protrusion has at least one inclined groove; and wherein the coupling mechanism has at least one shuttle configured movably coupled within the at least one inclined groove.

20. The method of claim 17, further comprising:

limiting lateral movement of the coupling mechanism relative to the dispense mechanism;

wherein a biasing member coupled with the dispense mechanism and the coupling mechanism limits the lateral movement.

* * * * *